Feb. 10, 1970 R. C. ZEIGLER, JR 3,494,622

TAPE CARTRIDGE STORAGE APPARATUS

Filed Sept. 23, 1968 2 Sheets-Sheet 1

ROBERT C. ZEIGLER, JR.
INVENTOR.

BY Roger A. Marrs

FIG. 3
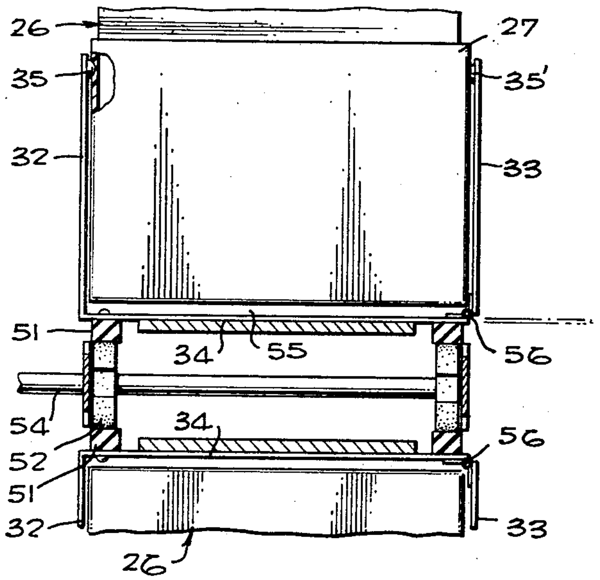
FIG. 9
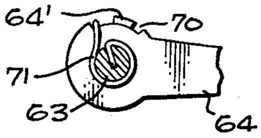
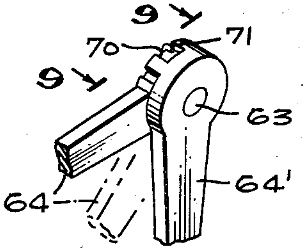
FIG. 8
FIG. 6
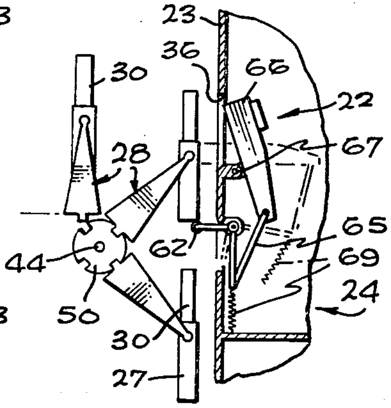
FIG. 4
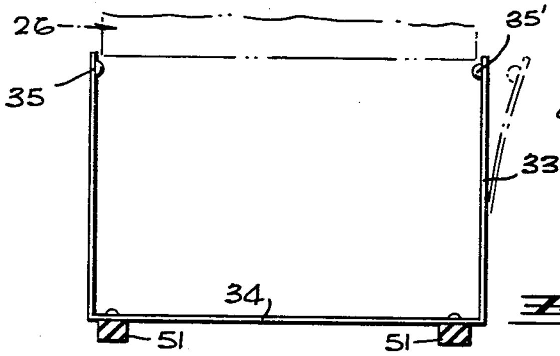
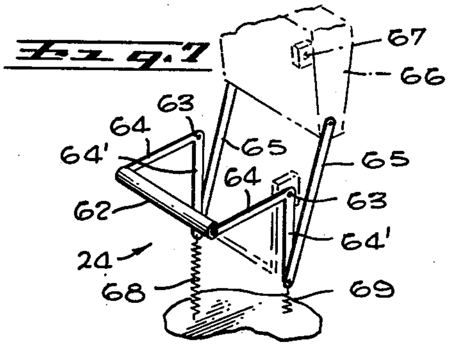
FIG. 5
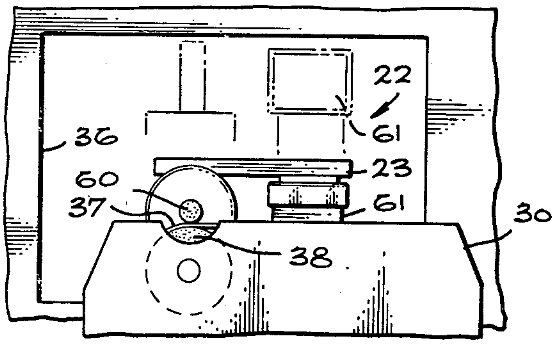
INVENTOR.
ROBERT C. ZEIGLER, JR.
BY
Roger A. Marra 3,494,622

TAPE CARTRIDGE STORAGE APPARATUS

Robert C. Zeigler, Jr., 11031 Woodward, Sunland, Calif. 91040

Filed Sept. 23, 1968, Ser. No. 761,538
Int. Cl. G11b 5/54
U.S. Cl. 274—4 13 Claims

ABSTRACT OF THE DISCLOSURE

The tape cartridge storage apparatus disclosed herein includes a continuous, movable, belt-like carrier detachably holding a plurality of magnetic tape cartridges in close proximity and oriented so that a formed tape reading window in each cartridge exposes a portion of prerecorded magnetic tape for playback purposes. A playback mechanism including a tape drive roller and magnetic reading head is movably positionable into a playback condition with respect to the exposed tape on a selected cartridge and actuating means are provided for moving the playback mechanism to and from its playback position in response to selection and advancement of a predetermined tape cartridge into the playback station.

BACKGROUND OF THE INVENTION

Field of the invention

This invention relates to magnetic tape cartridge storage system and, more particularly, to a novel tape cartridge storage apparatus for releasably holding a plurality of cartridges whereby a selected cartridge may be employed to operably position a playback mechanism via an actuating mechanism for reading the magnetic tape carried on the selected cartridge.

Description of the prior art

For many years, it has been the conventional practice to pre-record music and other entertainment renditions on an endless loop of magnetic tape which is carried in a cartridge adapted to be inserted into a suitable playback mechanism, such as a tape recorder. The individual tape cartridges are separate units as well as the playback mechanism and when a particular tape is selected, the cartridge carrying the tape is inserted into a receiver in the tape recorder so that a drive roller on the tape recorder engages with an exposed portion of the tape for driving the tape past a playback head. Although such systems have been in use in the home for many years, it has only been recently that such tape recorders having playback mechanisms have been provided for automobile use. Obviously, the space requirements of an automobile are extremely limited and restricted so that orderly storage of many tape cartridges becomes awkward and creates a problem for the owner.

Normally, several tape cartridges may be kept in the glove compartment of the automobile or in some instances, a separate compartment may be installed for holding a quantity of tape cartridges from which the operator may select a particular cartridge. The operator removes the selected cartridge from the storage compartment and manually inserts the cartridge into the tape recorder where the playback mechanism automatically commences playback of the pre-recorded selection.

Many difficulties and problems have been encountered when employing separate storage compartments for tape cartridges in that such a compartment occupies a relatively large volumetric area in addition to the space occupied by the tape recorder. In other instances, the storage compartment is intentionally made of relatively small size so as to hold perhaps five tape cartridges which are selected by the operator from a master storage arrangement within his home and subsequently transferred to the limited storage area or compartment in the automobile. Still a further problem is encountered because many persons have a tendency to leave the tape cartridges on the automobile seat or on top of the dashboard in which case, the tape cartridges are often stolen or inadvertently damaged when dropped or thrown against the structure of the automobile.

Recently, the overall size of conventional tape cartridges has been reduced by closely packing the coils or loops of tape and these new tape storage units are known in the art as "casettes." Although the overall size has been reduced, the casettes are handled in the same way as the tape cartridges so that storage and handling of the casettes is identical to the procedures for handling tape cartridges. Therefore, it can be seen that a long standing need has existed for a suitable tape cartridge or casette storage system.

SUMMARY OF THE INVENTION

Accordingly, the above mentioned difficulties and problems have been obviated by the present invention which provides a housing having a tape cartridge storage area and a playback mechanism located adjacent one end of the storage area. An endless belt-like carrier is rotatably mounted in the storage area which includes a plurality of holders for detachably and pivotably mounting a predetermined number of tape cartridges on the carrier. Drive means are provided for moving the carriage so that each of the cartridges will pivot on its mounting at the opposite ends of the belt-like carriage which pivoting action causes a selected cartridge at a selected end of the carriage to engage with actuating mechanism in the playback station adapted to position the playback mechanism into a recording mode of operation.

Control switch means are provided for placing the storage apparatus in an automatic mode of operation whereby each of the tape cartridges will play successively or the control switch mechanism may be employed for selecting a particular tape from the plurality of cartridges which then actuates the playback mechanism for selected play.

The inventive concept further includes arranging the playback mechanism so as to be movably positionable with respect to the tape cartridges mounted on the carrier so that a unitary structure is provided that may be readily mounted in an automobile or which may be used in the home.

Therefore, it is among the primary objects of the present invention to provide a novel tape cartridge or casette storage apparatus incorporating a movable carrier for detachably holding a plurality of individual tapes and a playback mechanism adapted to be moved into a playback position adjacent a selected tape.

Another object of the present invention is to provide a novel tape storage apparatus wherein a multiplicity of tape cartridges or casettes may be detachably carried on a movable carrier so as to travel past a recording station into which a playback mechanism is positionably moved in response to actuation by a selected tape cartridge on the carrier.

Still another object of the present invention is to provide a novel tape storage apparatus in which a plurality of tape cartridges are detachably mounted on a movable member adapted to introduce a selected cartridge from the plurality to a playback mechanism which provides a unitary structure incorporating control means for actuation of the movable member so as to eliminate manual operation.

Yet another object of the present invention is to provide a novel tape storage apparatus incorporating a pivotal playback mechanism adapted to be actuated into an operating position by a selected tape cartridge carried on a movable member adapted to pass a plurality of tape cartridges past a playback station.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 3 is a sectional view of the storage apparatus taken in the direction of arrows 3—3 of FIGURE 2 showing a cartridge retaining means;

FIGURE 4 is an elevational view of another embodiment of a cartridge retaining means;

FIGURE 5 is an enlarged fragmentary sectional view of the tape playback mechanism shown in FIGURE 1 as taken in the direction of arrows 5—5 thereof;

FIGURE 6 is a sectional view of the storage apparatus showing actuation of the playback mechanism by a selected tape cartridge;

FIGURE 7 is a perspective view of the actuating means employed in the apparatus of FIGURE 6;

FIGURE 8 is an enlarged perspective view of a portion of the actuation linkage shown in FIGURES 6 and 7; and FIGURE 9 is a sectional view of the actuation linkage shown in FIGURE 8 as taken in the direction of arrows 9—9 thereof.

DESCRIPTION OF THE PREFERRED EMBODIMENT

Figures 1, 2:
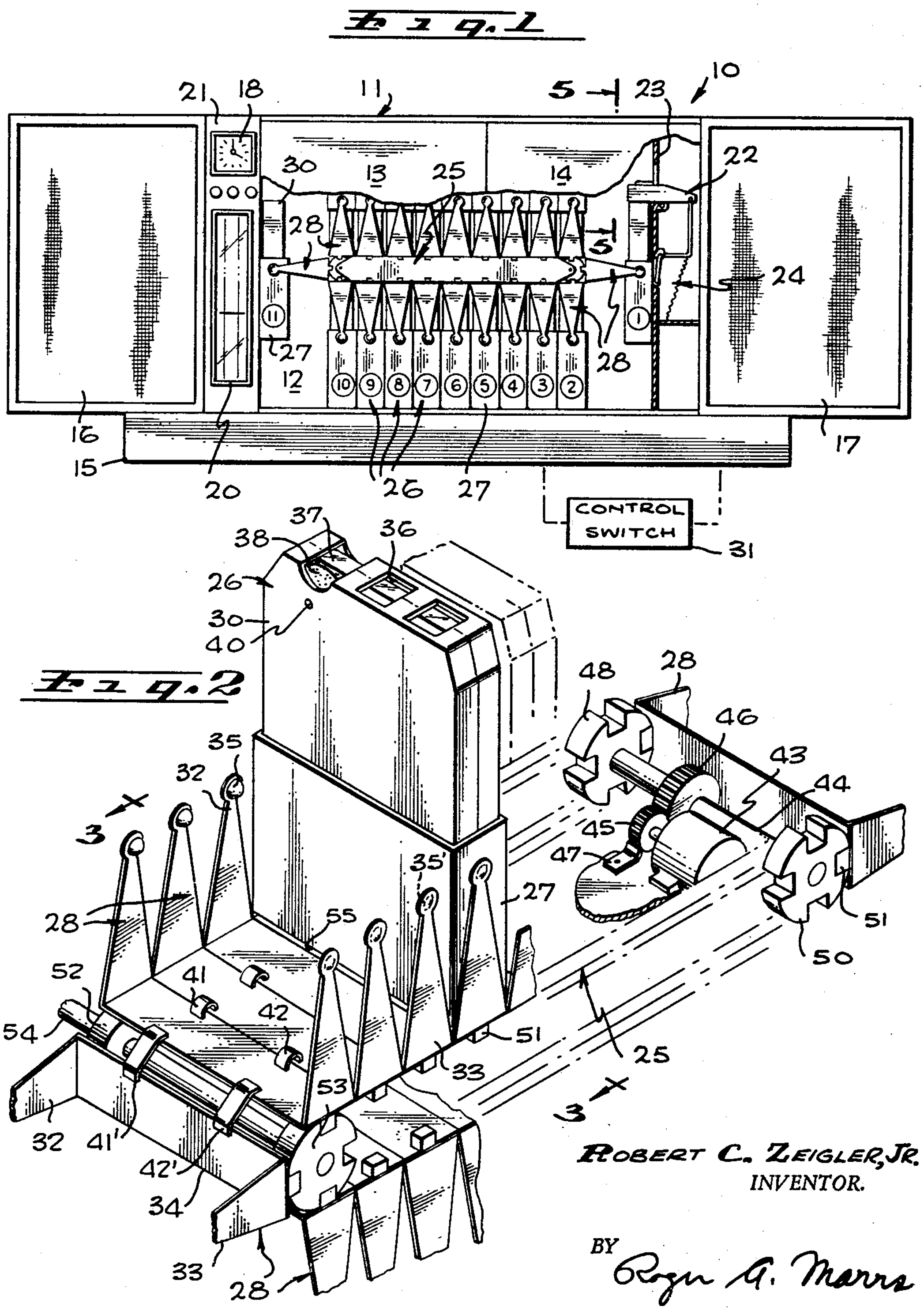
FIGURE 1 is a front elevational view of the tape cartridge storage apparatus of the present invention illustrated in combination with a playback mechanism and loudspeaker array.
FIGURE 2 is an enlarged perspective view of the storage apparatus shown in FIGURE 1 and illustrating the drive mechanism therefor.

Referring to FIGURE 1, the tape cartridge storage apparatus of the present invention is illustrated in the direction of arrow 10 which takes the form in one embodiment of a cabinet 11 having an internal storage area 12 located directly behind movable closure panels 13 and 14. The closure panels are so arranged on the cabinet that either one or the other may be slid behind the adjacent panel so as to gain access to the storage area when desired. The cabinet 11 is mounted on a base 15 which also supports a pair of speakers 16 and 17 located on the opposite ends of the cabinet 11 so as to provide a stereo system.

The cabinet 11 may also be provided with a clock 18 and a tuning mechanism 20 for selection of AM or FM radio stations. The electronic circuitry for the radio and the mechanism for the clock may be located in a cabinet portion 21 adjacent to the tape cartridge storage area 12. Inasmuch as the radio and clock may be of conventional design employing circuitry known to those skilled in the art, the details of the circuitry are not shown.

Located on the end of the cabinet 11 opposite to its end adjacent portion 21, there is provided a playback mechanism 22 movably mounted on a partition 23 defining one end of the storage area 12. The playback mechanism is moved into and out of the playback station by means of an actuating means indicated in general by numeral 24 which will be described later with respect to FIGURES 5–9 inclusive.

Disposed within the storage area 12 is a movable member or carrier indicated by numeral 25 on which are carried a plurality of individual and separate tape cartridges such as those indicated by numeral 26. Each of the tape cartridges includes a support portion 27 adapted to be pivotally carried by a mounting means 28 carried on the movable member 25. The cartridge further includes a portion 30 exposing a portion of the endless loop of tape carried on the cartridge so that access to the tape may be arranged for the playback mechanism. It is to be kept in mind that since a multiplicity of tape cartridges are employed, a plurality of mounting means 28 are included so that a mounting means is available to releasably and pivotally mount each of the respective cartridges in a high density side-by-side packing arrangement. Furthermore, each of the cartridges is a standard endless loop magnetic tape cartridge which may also take the form of a conventional casette type cartridge. Each of the cartridges are numbered in a predetermined numerical sequence so as to be visually identifiable when mounted on the mounting means when either of the panels 13 or 14 are positioned to expose the storage area 12. For example, when the panel 14 is slid behind the panel 13, it can be seen that the tape cartridge number "1" is at the playback station with the playback mechanism 22 is position against the extreme end of portion 30 so as to commence playback of the magnetic information carried on the tape associated with cartridge "1."

Means may be provided in the form of a control switch 31 that may be operated by the user of the equipment so as to cause the movable member 25 to move until a desired tape cartridge is at the playback station. By this means, any one of the plurality of tape cartridges may be preselected and positioned to the playback station by the control means 31. Also, it is contemplated that the control means 31 include suitable circuitry so that once a sequence has been determined for tape cartridge playback, the movable member 25 will be actuated at the end of play for a given tape so that the next tape cartridge in the sequence will be positioned into the playback station. This sequence may be continued until all of the tape cartridges in the sequence have been played.

Referring now to FIGURE 2 in detail, the tape storage apparatus of the present invention includes movable member 25 which takes the form of an endless, belt-like carrier composed of a plurality of mounting means 28 arranged laterally across the member 25 in adjacent end-to-end relationship so as to provide a continuous member. Each of the mounting means 28 includes a pair of upright end elements 32 and 33 integrally formed at opposite ends of a base 34. The extreme free ends of each element 32 and 33 includes an inwardly extended projection 35 and 35' adapted to snap lock with a corresponding depression formed on the opposite sides of portion 27 of a cartridge 26. A cartridge may be readily snapped in place on the mounting means 28 by bending the mounting means elements 32 and 33 outwardly and inserting portion 27 of the cartridge therebetween. When the cartridge rests adjacent the bottom 34, the elements 32 and 33 are released to snap the projection 35 and 35' into the corresponding depressions formed in the opposite sides of the portion 27. This provides a pivot mounting for the cartridge. It is to be kept in mind that the end of the cartridge adjacent bottom 34 permits sufficient clearance to be maintained so that the cartridge may be pivoted on the projections 35 and 35' when the cartridge reaches the opposite ends of the belt member 25 as the carrier moves.

It is to be noted that the portion 30 of each cartridge includes a window 36 formed in the end of the cartridge so as to expose a portion of magnetic tape 37. The recording head of the playback mechanism is adapted to be placed adjacent to portion 27 of the magnetic tape for playback purposes. The tape is further trained over an idler roller 38 which is pivotally mounted on the cartridge by means of shaft 40. A drive roller carried on the playback mechanism engages with the portion of the tape trained over the idler roller so that the tape may be driven thereby within the cartridge.

The mounting means 28 are connected together by an expandable joint taking the form of resilient plastic members 41 and 42 connecting opposing edges of adjacent base sections of the mounting means. The expandable or resilient connections 41 and 42 are adapted to permit adjacent mounting means to separate from one another for a limited distance so as to permit the mounting means to travel in an arcuate path at the opposite ends of the belt-like carrier. Expandable connectors 41′ and 42′ indicate expansion to permit the mounting means to travel in the curved path.

The belt-like carrier 25 is driven by means of a motor 43 operatively coupled to a drive shaft 44 by means of gear trains 45 and 46. An anti-reverse ratchet 47 is provided to ensure that rotation of drive shaft 44 will be in a selected direction. The opposite ends of drive shaft 44 are provided with sprocket gears 48 and 50 having alternate teeth and indentations provided about each of its peripheries wherein the depressions are engaged by downwardly depending teeth 51 formed on the opposite ends of the base 34 of each mounting means. Therefore, as the shaft 44 rotates carrying sprockets 48 and 50 therewith, the teeth 51 of each mounting means will be picked up by the depressions in the sprockets and, since the base sections of each mounting means are connected together, the belt-like carrier will be moved accordingly.

A forward idler sprocket arrangement is provided comprising sprockets 52 and 53 secured on the opposite ends of a shaft 54 similar to the drive sprocket arrangement. The sprocket arrangement on shaft 54 is mounted as a slave so as to support the end of the movable carrier 25 opposite to its end supported by the drive sprocket. Therefore, it can be seen that the movable carriage or member 25 is supported on the drive and slave sprocket assemblies so that movement of the carrier is controlled thereby and that the cartridges on the movable carriage follow a repetitive path past the playback station adjacent partition 23.

Furthermore, it is within the concept of the present invention to provide a movable member or carriage 25 which takes the form of a molded belt composed of plastic with thin webs disposed between cartridge mounting attachment links which operate as both a hinge and spacer between adjacent mounting attachments. In this latter instance, the belt would be of a one-piece molded plastic construction and preferably, the sprockets would have rounded or curved peripheries to accommodate the arcuate path of the belt around the sprockets. In this instance, the connecting links 41 and 42 would be eliminated since the adjacent bases 34 of the mounting attachment would be integrally formed by the solid flexible webs.

Referring now in detail to FIGURE 3, it can be seen that the projections 35 carried on the mounting attachments operate as pivot points of the cartridges 26 when installed thereon. A space 55 is defined between the bottom of the cartridge and the opposing surface of base section 34 so that the cartridge is free to rotate about the pivot connections with projections 35. If desired, the side elements 33 of the mounting means for the cartridges may be modified to include a hingle 56 rotatably connecting the end of the element to the end of base section 34. By this means, the cartridges may be readily installed by pivoting the lateral element 33 out of the way and when the portion 30 of the cartridge has been placed in position, the lateral element may be raised so that its projection 35′ will mate with its corresponding depression molded in the case of a cartridge. However, in FIGURE 4, it can be seen that the element 33 may be integrally formed with the base 34 so that the element may be manually pulled outwardly to permit insertion or withdrawal of the cartridge from the space between the pair of element sections 32 and 33. As shown in broken lines, element 33 is extended against its internal bias outwardly to permit installation or removal of the cartridge.

As shown in FIGURE 5, the playback mechanism 22 includes a drive wheel 60 in engageable contact with the tape portion 37 so as to drive the tape against idler roller 38. Also, the playback includes a magnetic recording head 61 disposed through window 36 in operable position to sense the magnetically recorded signals on the surface of the tape 37. As shown in broken lines, the tape drive 60 and the playback head 61 are pivotally removed from the area of cartridge travel.

In FIGURE 7, playback mechanism actuating means 24 is illustrated which includes a striker bar 62 cantilevered into the travel path of the plurality of cartridges from a pivotal connection 63 by a first pair of links 64. A second pair of links 64′ extends from the pivotal connection 63 downwardly to terminate in a pivotal connection with one end of a third pair of links 65. The opposite ends of links 65 are pivotally attached to one end of the drive mechanism and playback head housing 66. The housing 66 is pivotally mounted by pivot connection 67 to the partition 23. Therefore, when the movable carriage 25 is actuated and driven by motor 43, a cartridge will enter into the playback station or zone and forcibly engage with the strike bar 62 causing the bar to move downwardly about pivots 63 against the compressive tension of spring means 68 and 69. As the strike bar 62 moves downwardly, links 65 will move upwardly about their pivotal connection with housing 66 so that the playback housing will pivot on connection 67 into the position shown in FIGURE 1 whereby the drive wheel 60 will engage with a portion of the tape in the cartridge and playback head 61 is in position to sense the magnetic recording of the tape.

This action is more clearly shown in FIGURE 6 in which a tape cartridge 26 advances about the arcuate path of drive sprocket 50 in pivoting relationship to the mounting means 28. The lower end of the cartridge strikes against the bar 62 which causes the actuator means linkage to move from their position shown in solid lines to the position shown in broken lines. The spring means 68 and 69 are connected to the actuator linkage and are in critical location with respect to pivot connection 67 so that the playback housing 66 will remain in the position shown in broken lines after the strike bar has moved to its lower position also shown in broken lines in alignment with the partition 23.

A timer may be employed in the control switch circuitry for deenergizing the motor 43 while the selected tape is being played. The timer may be started by means of a microswitch actuated by either the cartridge or a portion of the actuating means. At the end of play, the motor advances the carrier and the springs force the playback mechanism to pivot rearwardly out of the playback station whereby the strike bar 62 is positioned to interfere with the travel path of the next cartridge.

In order to permit full actuation by the actuation means, a limited amount of lost motion is provided as the strike bar moves downwardly in response to contact with a particular cartridge so that links 64 will pivot on connection 63 for a short period of time before links 64′ move upwardly and rearwardly. In general, a spring loaded lever mechanism allows the tape cartridge to contact the strike bar 62 without actuating the playback mechanism until the cartridge has cleared the playback station. This relationship is indicated in FIGURES 8 and 9 in which the connection between the links 64 and 64′ comprise a slot 70 formed in the end of link 64 into which one end of a spring 71 is disposed while the opposite end of spring 71 is coupled to the connection 63 fixed on the end of ling 64′. Therefore, the link 64 will move from the position shown in solid lines to the position shown in broken lines before actual movement of the link 64′ will occur.

Therefore, the tape cartrige storage apparatus of the present invention provides a novel system for holding a plurality of separate tape cartridges in a predetermined orderly array and in a high density packaging arrangement. The movable carrier 25 introduces selected tapes to the playback station or zone under control of the control switch means 31. Actuating means 24 movably positions the playback mechanism 22 in proper location for driving the tape on the cartridge as well as reading the magnetic information stored thereon. The electronic circuitry for the playback mechanism may be of any conventional type known to those skilled in the art and, if prefererd, may be separate or coupled into the radio circuitry associated with tuner 20. The cabinet 11 may be suitably mounted in an automobile immediately below the dashboard and may be detachably mounted so that the cabinet may be readily removed and used in the home. The tape cartridges may be readily replaced or substituted with additional tape selections by removing the cartridges from the mounting means 28 when it is desired to change tapes rather than to remove the cabinet 11.

While particular embodiments of the present invention have ben shown and described, it will be obvious to those skilled in the art that changes and modifications may be made without departing from this invention in its broader aspects.

What is claimed is:

1. A tape cartridge storage apparatus adapted to hold a plurality of tape cartridges in a predetermined order comprising:

a movable member;

mounting means carried on said movable member adapted to detachably retain each of said cartridges on said movable member so that said cartridges are arranged next to one another;

a playback mechanism pivotally carried in alignment with respect to said cartridges and being interposed in the travel path of said cartridges;

drive means for moving said movable member.

said movable member comprises an endless belt, and said drive means includes a sprocket and drive arrangement engageable with said belt for moving said belt in a rectilinear path;

said mounting means includes a base section having opposed edges and forming an integral part of said belt, and lateral elements carried on said opposed edges of said base section adapted to releasably couple with the opposite sides of a cartridge; and control means operably connected to said drive means and to said playback mechanism for pivoting said playback mechanism into a playback position adjacent a selected one of said cartridges.

2. The invention as defined in claim 1 wherein:

said lateral elements includes means for pivotally mounting said cartridge between said lateral elements.

3. The invention as defined in claim 1 wherein:

said control means includes an actuation means pivotally coupled to said playback mechanism and having an interfering portion thereof located in the path of cartridge travel, and said actuation means operable to pivot said playback mechanism into said playback position in response to engagement of one of said cartridges with said interfering portion.

4. The invention as defined in claim 1 wherein:

said drive means includes means for moving said movable member in a non-reversible path of travel.

5. The invention as defined in claim 1 wherein:

a selected one of said lateral elements is pivotally mounted on said base section.

6. The invention as defined in claim 1 including:

flexible coupling means interconnecting the opposed edges of each of said base sections.

7. A tape cartridge storage apparatus for holding a predetermined number of tape cartridges in an orderly array comprising:

a cabinet having an elongated storage area defined at one end by a partition;

a playback mechanism pivotally carried on said partition adapted to move into said storage area;

a belt-like carriage movably supported in said storage area;

mounting means forming a part of said carriage for releasably and pivotally holding said tape cartridges adjacent each other in and endless row;

said belt-like carriage forms an elongated endless loop rotatably supported in said storage area whereby said tape cartridges extend outwardly from the periphery of said carriage on said mounting means; and actuation means movably mounted on said partition and pivotally connected to said playback mechanism operable in response to engagement by a selected one of said cartridges to move said playback mechanism into said storage area in playback relationship with said selected tape cartridge.

8. The invention as defined in claim 5 including:

drive means operably coupled to said carriage for moving said carriage so that said cartridges travel past said actuation means in a serial order.

9. The invention as defined in claim 6 wherein:

said actuation means includes a strike bar yieldably projecting into said storage area in interfering relationship with said cartridges.

10. The invention as defined in claim 7 including:

control means operably connected between said drive means and said playback mechanism for advancing said carriage and stopping said carriage when said selected cartridge and said playback mechanism are in their playback relationship.

11. The invention as defined in claim 7 wherein:

said actuation means includes a strike element pivotally mounted on said partition yieldably projecting in said storage area in interfering relationship with the travel path of said cartridges;

linkage means pivotally connecting said strike element to said playback mechanism; and resilient means connected between said linkage means and said cabinet for normally biasing said strike element into said storage area and said playback mechanism out of said storage area.

12. The invention as defined in claim 8 wherein:

said linkage means includes lost motion means for permitting limited movement of said strike element under yielding pressure of said selected cartridge before movement of said playback mechanism occurs.

13. The invention as defined in claim 7 including:

a drive means for moving said carriage in a predetermined direction which includes a first and a second sprocket arrangement rotatably supporting said carriage on said cabinet; and said carriage having a plurality of spaced apart projections adapted to be engaged by said sprockets to translate rotational movement of said sprockets to movement of said carriage.

References Cited

UNITED STATES PATENTS

| | | |
|---|---|---|
| 3,343,687 | 9/1967 | Deighton et al. |
| 3,289,962 | 12/1966 | Gellenthin. |
| 3,127,178 | 3/1964 | Osborne et al. |

LEONARD FORMAN, Primary Examiner

R. A. FIELDS, Assistant Examiner

U.S. Cl. X.R.

242—55.13